(12) United States Patent
Prabhakar et al.

(10) Patent No.: US 12,075,348 B2
(45) Date of Patent: *Aug. 27, 2024

(54) NON-PUBLIC WIRELESS COMMUNICATION NETWORKS

(71) Applicant: Apple Inc., Cupertino, CA (US)

(72) Inventors: Alosious Pradeep Prabhakar, Singapore (SG); Vijay Venkataraman, San Jose, CA (US); Mohammed Sadique, Parramatta (AU); Krisztian Kiss, Hayward, CA (US); Srinivasan Nimmala, San Jose, CA (US); Yifan Zhu, San Jose, CA (US); Utkarsh Kumar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,306

(22) Filed: Apr. 18, 2023

(65) Prior Publication Data
US 2023/0319700 A1    Oct. 5, 2023

Related U.S. Application Data

(63) Continuation of application No. 17/137,166, filed on Dec. 29, 2020, now Pat. No. 11,665,632.

(Continued)

(51) Int. Cl.
*H04W 4/00*    (2018.01)
*H04W 8/06*    (2009.01)
(Continued)

(52) U.S. Cl.
CPC ............ *H04W 48/18* (2013.01); *H04W 8/06* (2013.01); *H04W 8/12* (2013.01); *H04W 48/16* (2013.01); *H04W 84/12* (2013.01)

(58) Field of Classification Search
CPC ....... H04W 48/16; H04W 48/18; H04W 8/06; H04W 8/12; H04W 84/12
(Continued)

(56) References Cited

U.S. PATENT DOCUMENTS 9,578,584 B1    2/2017 Oroskar
2010/0215026 A1    8/2010 Cheng et al.
(Continued)

FOREIGN PATENT DOCUMENTS

CN    106465242    2/2017
CN    108322908    7/2018
(Continued)

OTHER PUBLICATIONS

Extended European Search Report for EP Application No. 20218026. 1-1212, May 31, 2021.
(Continued)

*Primary Examiner* — Temica M Beamer
(74) *Attorney, Agent, or Firm* — Kowert, Hood, Munyon, Rankin & Goetzel, P.C.

(57) ABSTRACT

A mobile device (UE) may access standalone non-public networks (SNPNs) in various different locations as equivalent SNPNs (eSNPNs) corresponding to a home SNPN of the device. The device may obtain a list of eSNPNs corresponding to the home SNPN, and may access a second SNPN at a location different from a location of the home SNPN, in response to identifying the second SNPN and the list including the second SNPN as an eSNPN corresponding to the home SNPN of the device. The eSNPNs may include roaming eSNPNs (ReSNPNs) for accessing an enterprise NPN globally and/or at various different locations. The eSNPN/ReSNPN list may be maintained in a new network identifier management function (NMF). NPNs may be implemented as network slice instances (NSIs) via identi- (Continued)

fying data in the single network slice selection assistance information (S-NSSAI). Multiple credentialed SNPNs of a UE may be prioritized for access by the UE.

20 Claims, 13 Drawing Sheets

Related U.S. Application Data

(60) Provisional application No. 62/956,472, filed on Jan. 2, 2020.

(51) Int. Cl.
  *H04W 8/12* (2009.01)
  *H04W 48/16* (2009.01)
  *H04W 48/18* (2009.01)
  *H04W 84/12* (2009.01)

(58) Field of Classification Search
  USPC .................................................. 455/432.1
  See application file for complete search history.

(56) References Cited

U.S. PATENT DOCUMENTS

| | | | |
|---|---|---|---|
| 2015/0326612 A1 | 11/2015 | Faccin et al. | |
| 2018/0242229 A1 | 8/2018 | Ahluwalia | |
| 2019/0174449 A1 | 6/2019 | Shan et al. | |
| 2020/0221372 A1 | 7/2020 | Shih et al. | |
| 2020/0245235 A1 | 7/2020 | Chun | |

FOREIGN PATENT DOCUMENTS

| | | |
|---|---|---|
| CN | 110248357 | 9/2019 |
| WO | 2017197296 | 11/2017 |
| WO | 2020/205609 | 10/2020 |

OTHER PUBLICATIONS

Apple "Solution of Key Issue #5: Support of Equivalent SNPN"; SA WG2 Meeting #136-AH, S2-2000748; Jan. 13-17, 2020.
Nokia et al. "Network and cell (re)selection SNPN access mode"; 3GPP TSG-RAN WG2 Meeting #108; R19153884, R2-1912656; Nov. 18-22, 2019.
Examination Report for EP Patent Application No. 20218026.1; Jun. 20, 2023.
Ericsson "Discussion to SNPN selection"; 3GPP TSG-CT WG1 Meeting #115 C1-191153; Feb. 25, 2019.
Office Action for CN Patent Application No. 202011625130.6; Jan. 1, 2024.
Qualcomm Inc et al. "TS 23.501: Introducing Non-Public Network", 3GGP TSG-SA2 Meeting #131 S2-1902067; Feb. 25, 2019.

| Service Name | Service Operations | Operation Semantic | Known Consumer(s) |
|---|---|---|---|
| Nnmf_eSNPN | Addition, Delete, Validate | Request/Response | AMF, AF |
| | Subscribe, Unsubscribe, Notify | Subscribe/Notify | AMF, AF |

FIG. 14

NON-PUBLIC WIRELESS COMMUNICATION NETWORKS

PRIORITY CLAIM

This application is a continuation of U.S. patent application Ser. No. 17/137,166 titled "Non-Public Private Networks", filed Dec. 29, 2020 and claiming benefit of priority of U.S. Provisional Patent Application Ser. No. 62/956,472 titled "Non-Public Wireless Communication Networks", filed on Jan. 2, 2020, both of which are hereby incorporated by reference as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, including providing support in mobile devices for access to and communication over non-public wireless communication networks, also referred to as private networks.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, cHRPD), IEEE 802.11 (WLAN or Wi-Fi), IEEE 802.16 (WiMAX), BLUETOOTH™, etc. A next telecommunications standard moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

One aspect of cellular communication systems involves communicating over licensed and unlicensed spectrum in respective networks operated by major service providers and lower tier providers, respectively. Improvements in the field are desired.

SUMMARY OF THE INVENTION

Embodiments are presented herein of, inter alia, of methods and procedures for various devices, e.g. wireless communication devices, to connect to and communicate over private cellular networks, e.g. LTE and/or NR networks, and achieve seamlessly mobility between various wireless communication systems that include private LTE/NR networks. Embodiments are further presented herein for wireless communication systems containing wireless communication devices (UEs) and/or base stations and access points (APs) communicating with each other within the wireless communication systems.

Pursuant to the above a UE may be operated to have access to standalone non-public networks (SNPNs) in various different locations as equivalent SNPNs (eSNPNs) which are considered by the UE to be equivalent to a home SNPN of the UE. The UE may obtain a list of eSNPNs corresponding to the home SNPN (e.g., a list of SNPNs considered equivalent to the home SNPN of the UE), and may access a second SNPN at a location different from a location of the home SNPN at least in response to identifying the second SNPN, and further in response to the eSNPN list including the second SNPN as an eSNPN of the home SNPN. The eSNPNs may include roaming eSNPNs (ReSNPNs) for accessing an enterprise NPN globally and/or at various different locations. The eSNPN/ReSNPN list may be maintained in a new network identifier management function (NMF). Of the core network functions, the application function (AF) and access and mobility management function (AMF) may access and communicate with the NMF to manage, update, and provide the eSNPN/ReSNPN list to the UE. NPNs may also be implemented as network slice instances (NSIs) through the use of new values in the single network slice selection assistance information (S-NSSAI). Multiple SNPNs for which the UE has credentials may be prioritized for access by the UE.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 14 shows a table listing exemplary service operations that may be provided by an NMF, according to some embodiments.

Figure 1:
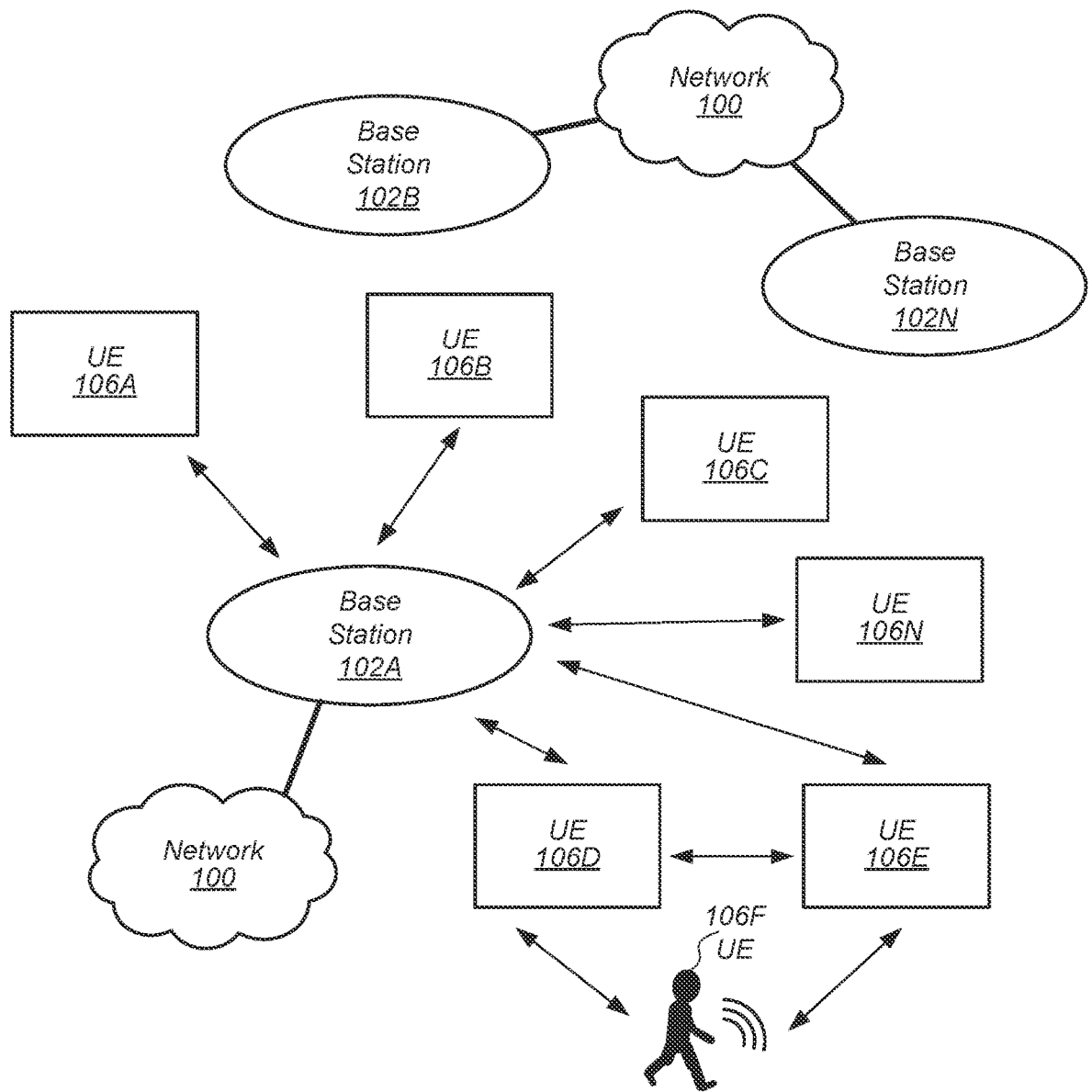
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AF: Application Function
AMF: Access and Mobility Management Function
AMR: Adaptive Multi-Rate
AP: Access Point
APN: Access Point Name
APR: Applications Processor
BS: Base Station
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DN: Data Network
DSDS: Dual SIM Dual Standby
DYN: Dynamic
EDCF: Enhanced Distributed Coordination Function
eSNPN: Equivalent Standalone Non-Public Network
FDD: Frequency Division Duplexing
FT: Frame Type
GAA: General Authorized Access
GPRS: General Packet Radio Service
GSM: Global System for Mobile Communication
GTP: GPRS Tunneling Protocol
HPLMN: Home Public Land Mobile Network
IMS: Internet Protocol Multimedia Subsystem
IOT: Internet of Things
IP: Internet Protocol
LAN: Local Area Network
LBT: Listen Before Talk
LQM: Link Quality Metric
LTE: Long Term Evolution
MCC: Mobile Country Code
MNO: Mobile Network Operator
NAS: Non-Access Stratum
NF: Network Function
NG-RAN: Next Generation Radio Access Network
NID: Network Identifier
NMF: Network Identifier Management Function
NPN: Non-Public (cellular) Network
NRF: Network Repository Function
NSI: Network Slice Instance
NSSAI: Network Slice Selection Assistance Information
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSS: Primary Synchronization Signal
PT: Payload Type
QBSS: Quality of Service Enhanced Basic Service Set
QI: Quality Indicator
RA: Registration Accept
RAT: Radio Access Technology
RF: Radio Frequency
ROHC: Robust Header Compression
RR: Registration Request
RTP: Real-time Transport Protocol
RX: Reception/Receive
SAS: Spectrum Allocation Server
SD: Slice Descriptor
SI: System Information
SIB: System Information Block
SID: System Identification Number
SIM: Subscriber Identity Module
SGW: Serving Gateway
SMF: Session Management Function
SNPN: Standalone Non-Public Network
SSS: Secondary Synchronization Signal
SUPI: Subscription Permanent Identifier
TBS: Transport Block Size
TCP: Transmission Control Protocol
TDD: Time Division Duplexing
TX: Transmission/Transmit
UAC: Unified Access Control
UDM: Unified Data Management
UDR: User Data Repository
UE: User Equipment
UI: User Input
UL: Uplink (from UE to BS)
UMTS: Universal Mobile Telecommunication System
UPF: User Plane Function
URM: Universal Resources Management
URSP: UE Route Selection Policy
USIM: User Subscriber Identity Module
Wi-Fi: Wireless Local Area Network (WLAN) RAT based on the Institute of Electrical and Electronics Engineers' (IEEE) 802.11 standards
WLAN: Wireless LAN

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAS, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHZ to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A carrier bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
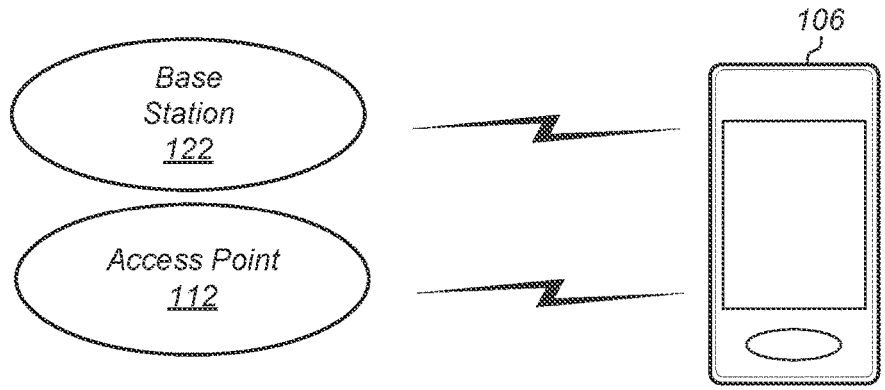
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may operate to recognize and communicate over private LTE/NR networks, with the capacity to effectively move between various wireless communication systems that include private LTE/NR networks, and operate on those networks according to various aspects disclosed herein.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102A may facilitate communication between the user devices 106 and/or between the user devices 106 and the network 100. In particular, the cellular base station 102A may provide UEs 106 with various telecommunication capabilities, such as voice, short message service (SMS) and/or data services. The communication area (or coverage area) of the base station 106 may be referred to as a "cell." It is noted that "cell" may also refer to a logical identity for a given wireless communication coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, cHRPD), Wi-Fi, WiMAX etc. Note that if the base station 102A is implemented in the context of LTE, it may alternately be referred to as an 'eNodeB' or 'eNB'. Similarly, if the base station 102A is implemented in the context of 5G NR, it may alternately be referred to as a 'gNodeB' or 'gNB'. In some embodiments, the base station 102 (e.g. an eNB in an LTE network or a gNB in an NR network) may communicate with at least one UE having the capability to recognize and communicate over private LTE/NR networks, with the capacity to effectively move between various wireless communication systems that include private LTE/NR networks, and operate on those networks according to various aspects disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHZ) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to private networks. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices 106 and/or between the user devices 106 and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and may possibly be within communication range of) one or more other cells (possibly provided by base stations 102B-102N and/or any other base stations), which may be referred to as "neighboring cells". Such cells may also be capable of facilitating communication in-between user devices 106 and/or between user devices 106 and the network 100. Such cells may include "macro" cells, "micro" cells, "pico" cells, and/or cells which provide any of various other granularities of service area size. For example, base stations 102A-102B illustrated in FIG. 1 may be macro cells, while base station 102N may be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting in a similar manner with the vehicles represented by UEs 106D and 106E. Various aspects of vehicles communicating in a network exemplified in FIG. 1 are disclosed, for example, in the context of vehicle-to-everything (V2X) communications such as the communications specified by certain versions of the 3GPP standard, among others.

FIG. 2 illustrates an exemplary user equipment 106 (e.g., one of UEs 106A through 106N) in communication with the base station 122 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and separate radios for communicating using each of Wi-Fi and BLUETOOTH™. Other configurations are also possible.

Figure 3:
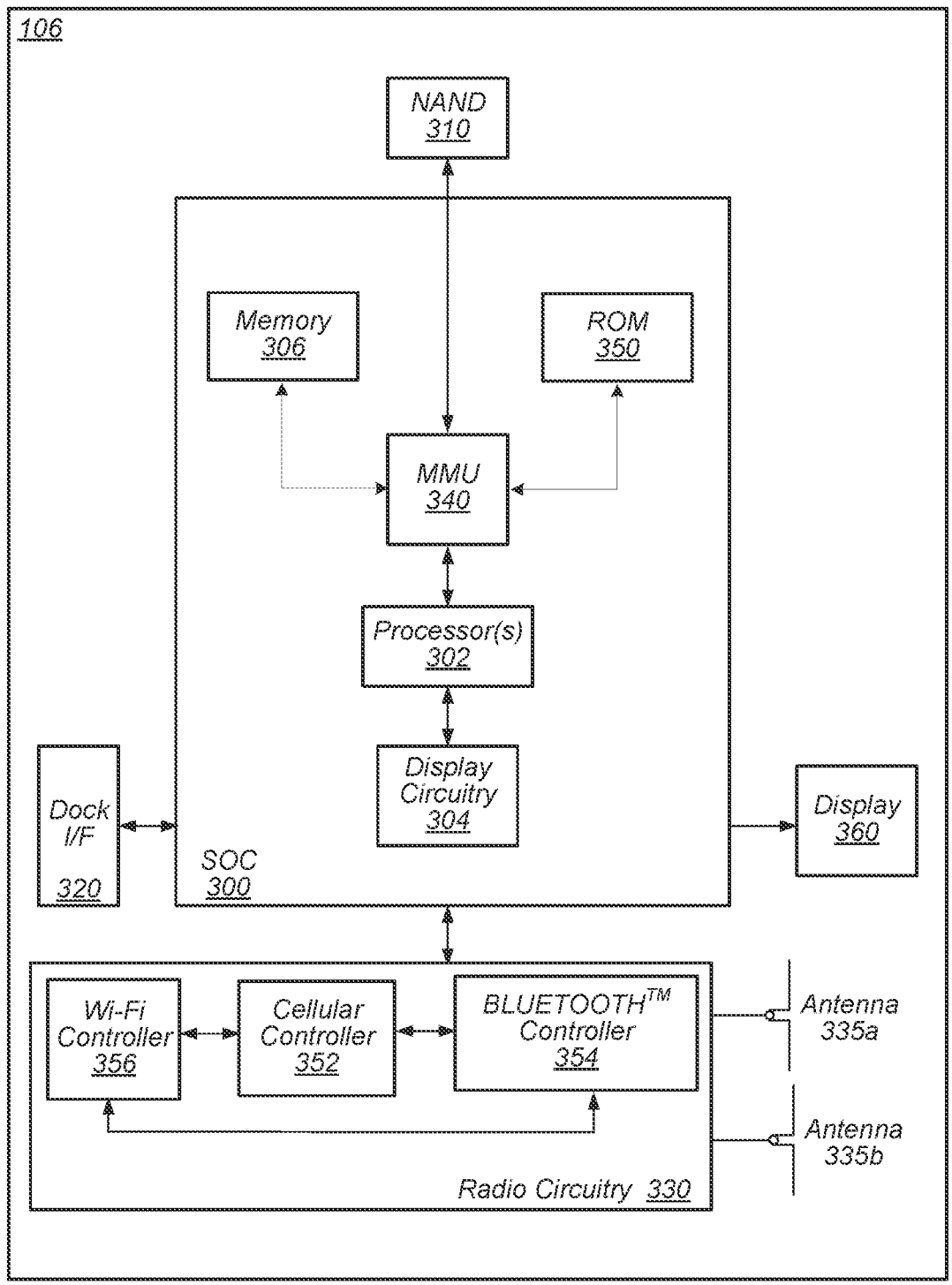
FIG. 3 illustrates an exemplary block diagram of a UE, according to some embodiments.

FIG. 3—Block Diagram of an Exemplary UE

FIG. 3 illustrates a block diagram of an exemplary UE 106, according to some aspects. As shown, the UE 106 may include a system on chip (SOC) 300, which may include various elements/components for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to recognize and communicate over private LTE/NR networks, with the capacity to effectively move between various wireless communication systems that include private LTE/NR networks, and operate on those networks according to various aspects disclosed herein. Thus, in some embodiments, UE 106 may use, among others, information indicative of private cellular networks, to potentially connect to private networks, and switch from operating on public cellular networks to operating on private cellular networks and vice-versa. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate recognizing and communicating over private LTE/NR networks, with the capacity to effectively move between various wireless communication systems that include private LTE/NR networks, and operating on those networks according to various aspects disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

Figure 5:
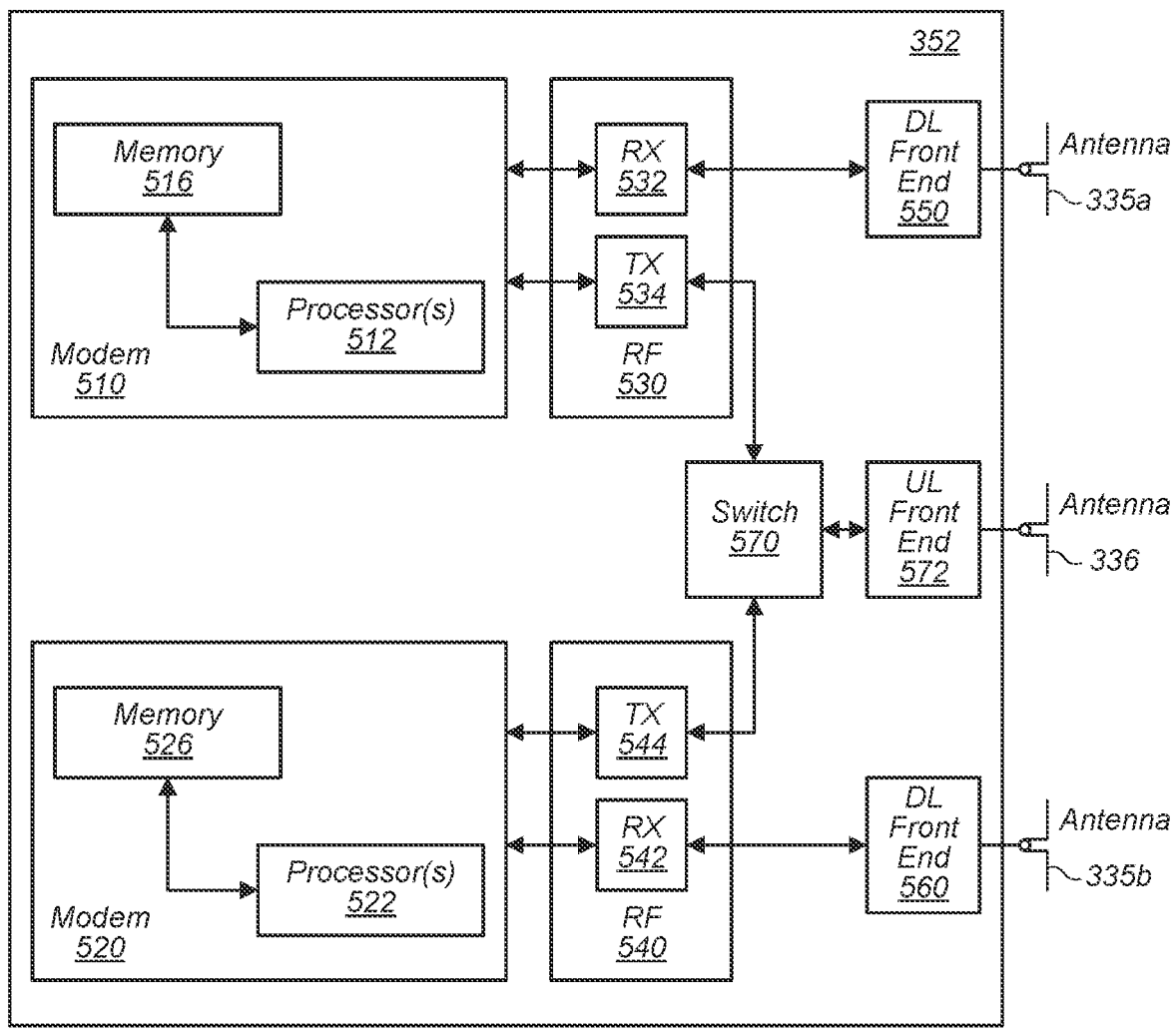
FIG. 5 shows an exemplary simplified block diagram illustrative of cellular communication circuitry, according to some embodiments.

In some embodiments, radio circuitry 330 may include separate controllers dedicated to controlling communications for various respective RATs and/or RAT standards. For example, as shown in FIG. 3, radio circuitry 330 may include a Wi-Fi controller 356, a cellular controller (e.g. LTE and/or NR controller) 352, and BLUETOOTH™ controller 354, and according to at least some aspects, one or more or all of these controllers may be implemented as respective integrated circuits (ICs or chips, for short) in communication with each other and with SOC 300 (e.g. with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments may have fewer or more similar controllers for various different RATs and/or RAT standards that may be implemented in UE device 106. For example, at least one exemplary block diagram illustrative of some embodiments of cellular controller 352 is shown in FIG. 5 and will be further described below.

Figure 4:
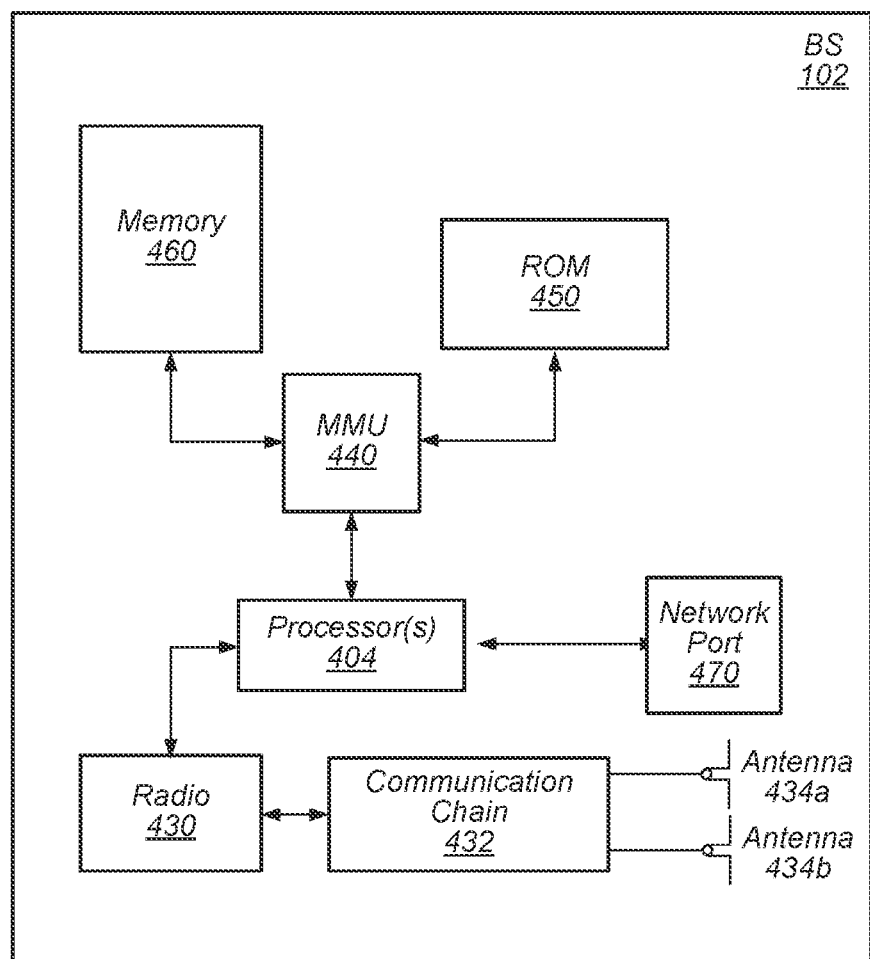
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna 434 or antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device capable of recognizing and communicating over private LTE/NR networks, with the capacity to effectively move between various wireless communication systems that include private LTE/NR networks, and operating on those networks. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices that recognize and communicate over private LTE/NR networks and have the capacity to effectively move between various wireless communication systems that include private LTE/NR networks and operate on those networks according to various embodiments disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Figure 6:
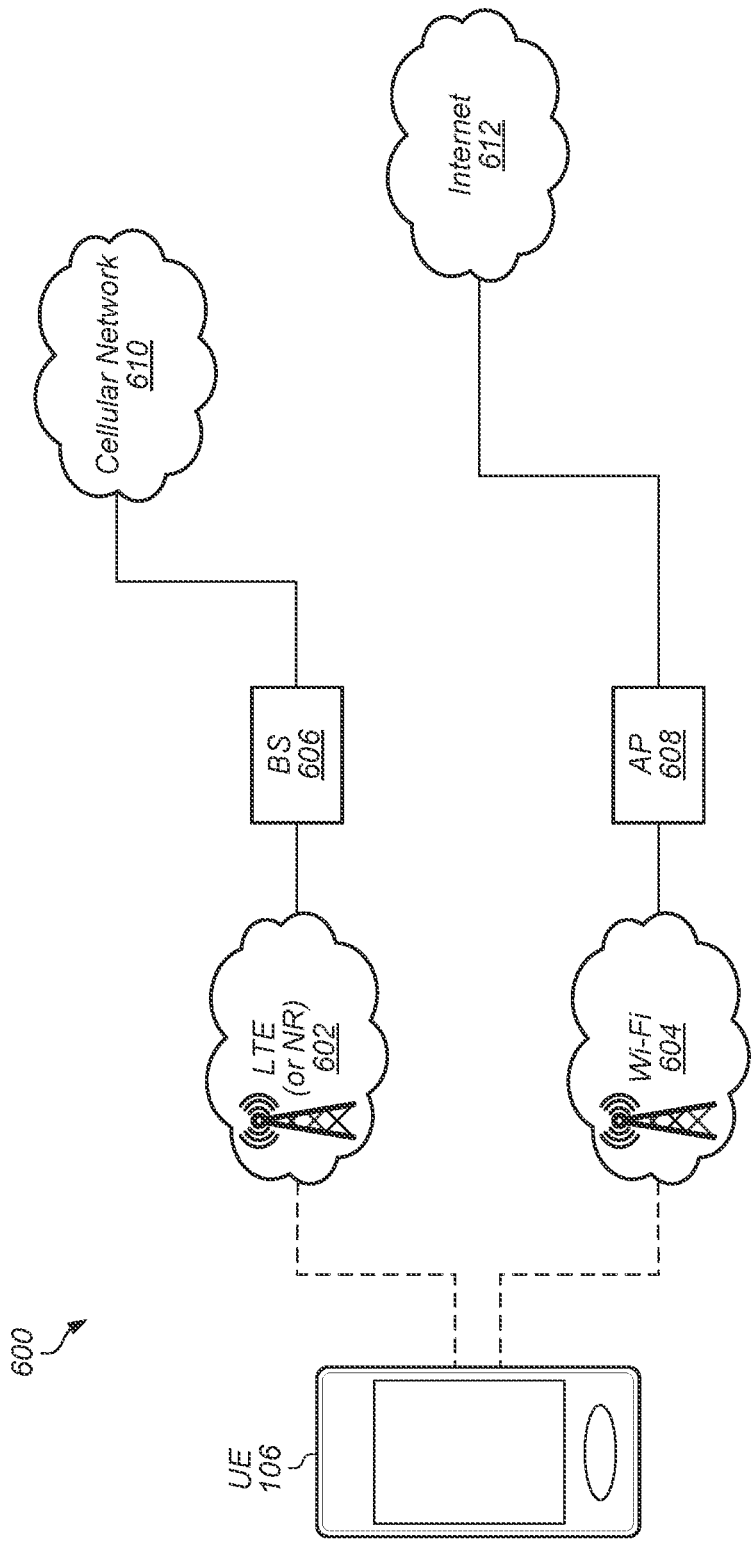
FIG. 6 illustrates an exemplary wireless communication system providing cellular and Wi-Fi coverage, according to some embodiments.

FIG. 6—Exemplary Communication System

FIG. 6 illustrates an exemplary wireless communication system 600 in which a device may communicate according to multiple radio access technologies (RATs) using different respective radio circuits for each RAT. System 600 is a system in which an LTE (or NR) access network and a Wi-Fi radio access network are implemented. The system 600 may include UE 106 and LTE (or NR) network 602 and Wi-Fi network 604.

LTE (or NR) access network 602 is representative of some embodiments of a first RAT access and Wi-Fi access network 604 is representative of some embodiments of a second RAT access. LTE (or NR) access network 602 may be interfaced with a broader cellular network (e.g. LTE or NR) and Wi-Fi access network 604 may be interfaced with the Internet 612. More particularly, LTE (or NR) access network 602 may be interfaced with a serving base station (BS) 606, which may in turn provide access to broader cellular network 610. The Wi-Fi access network 604 may be interfaced with an access point (AP) 608, which may in turn provide access to the Internet 612. UE 106 may accordingly access Internet 612 via AP 608 and may access cellular network 610 via LTE access network 602. In some embodiments, not shown, UE 106 may also access Internet 612 via LTE (or NR) access network 602. More specifically, LTE (or NR) access network 602 may be interfaced with a serving gateway, which may in turn be interfaced with a packet data network (PDN) gateway. The PDN gateway may, in turn, be interfaced with Internet 612. UE 106 may accordingly access Internet 612 via either or both of LTE (or NR) access network 602 and Wi-Fi access network 604. Accordingly, UE 106 may conduct various communications, e.g. data transfers or audio voice calls, via either or both of LTE (or NR) access network 602 and Wi-Fi access network 604. Furthermore, while FIG. 6 shows an LTE (or NR) access network, other cellular networks (not shown, e.g. a private network) may equally be accessed by UE 106 in a manner similar to accessing LTE (or NR) access network 602.

Public and Non-Public (Private) Cellular Networks

The rapid spread and use of wireless communications has led to an ever increasing deployment of distributed antenna systems (DAS). For many years, auctioned licensed spectrum allocations statewide and nationwide were exclusively acquired by Tier-1 cellular carriers as it proved too expensive for Tier-2/Tier-3 carriers and other potential local operators. Tier-1 carriers were thereby able to use the allocated spectrum as a strategic asset for 3GPP technologies, which has proven to be a barrier preventing innovation in wireless services and also slowing down service improvements. For example, deployment has been focused on Tier-1 venues, leaving Tier-2/Tier-3 venues and indoor venues with poor coverage. According to some estimates, approximately 30 billion square feet of commercial floor space in the United States experiences poor cellular coverage. Tier-2/Tier-3 network operators, enterprises, small communities and venue owners have not been able to acquire spectrum that would allow them to improve the wireless coverage in Tier-2/Tier-3 venues and indoor private buildings, which slows the densification and installation of small cells.

For at least the above reasons, the wireless industry as a whole has been pursuing a variety of service delivery models designed to offset the high costs while ensuring reliable and profitable in-building coverage and capacity. One particular solution that has received much attention is the neutral host. A neutral host shifts the ownership of the system from a carrier to either a building owner, DAS integrator or a third-party system provider. Such private mobile networks are designed and deployed specifically for enterprise users to provide opportunities to optimize and redefine business processes in ways that are either impractical or not possible within the limitations of wired and Wi-Fi networks. Under the neutral host model, the independent third-party (e.g. private or non-public) host assumes all financial, regulatory, legal and technical responsibility for deploying, installing and maintaining the system. The host may lease space or access to the system to one or more operators. The neutral host model provides a number of attractive benefits, chief among them the increased number of providers who are able and willing to help satisfy the growing demand in the market. To facilitate the installation, reduce the cost, and simplify the process and spread of effective neutral hosts, a new Citizens Broadband Radio Service (CBRS) for shared wireless broadband use of the 3550-3700 MHZ band (3.5 GHZ Band) was established. CBRS provides potential benefits of indoor and outdoor cellular services, e.g. LTE/NR services within a shared 3.5 GHz spectrum by opening up those bands for commercial use such as carrier-based cellular service extensions and private LTE/NR networks within enterprises, sports stadiums and conference centers, among others. In other words, CBRS band(s) can be used by cellular networks to provide private LTE/NR and neutral host networks (e.g. Wi-Fi Type deployments in buildings and enterprises) using LTE and/or 5G/NR small cells and networks.

The welcome addition of these new wireless services also raises new issues. Devices are expected to recognize and efficiently connect with and operate on these new wireless networks. In addition, improved device mobility is required to allow devices to seamlessly move from operating on one wireless service to operating on another wireless service.

As mentioned above, non-public (or private) cellular networks provide a variety of benefits next to public land mobile networks (PLMNs). PLMN refers to mobile wireless networks that use earth-based stations rather than satellites. PLMNs may be standalone, but are also often interconnected with a fixed system such as the public switched telephone network (PSTN). A PLMN typically includes several cellular technologies like GSM/2G, UMTS/3G, LTE/4G, and/or 5G/NR (to name just a few) offered by a single operator within a given country, often referred to as a cellular network. A PLMN is identified by a globally unique PLMN code, which includes a MCC (Mobile Country Code) and MNC (Mobile Network Code). The international mobile subscriber identity (IMSI; used in pre-5G/NR cellular technology), and subscription permanent identifier (SUPI; used in 5G/NR cellular technology) are numbers that uniquely identify every user of a pre-5G/NR and 5G NR cellular network, respectively.

Non-public cellular networks (NPNs) have been deployed in factories, for Internet of Things (IOT) devices, as enterprise information technology (IT) networks and the like. In some cases, NPNs are cellular networks specific to an organization or a corporate entity, with content for that entity hosted on private data networks. An NPN may typically be deployed as a standalone NPN (SNPN), which may be operated by an NPN operator that does not rely on network functions provided by a PLMN, or it may be deployed as a public network integrated NPN, which may be a network slice instance of a regular PLMN, for example. Wireless communication devices (UEs) may be classified based on access capability. Such classification may differentiate between UEs which are only authorized to access an NPN or NPN services, UEs which are only authorized to access regular PLMN services, and UEs which may simultaneously access both NPN services as well as PLMN services. In case of 3GPP NR, as an example. a UE may be configured with a SUPI and credentials for each SNPN it is authorized to access. Emergency services are currently not supported in SNPN access mode, but studies are being conducted regarding support enablement for emergency calls over NPN in the near future. It should be noted that a SUPI is a 5G/NR globally unique Subscription Permanent Identifier (SUPI) allocated to each subscriber and defined in 3GPP specification TS 23.501. The SUPI value is provisioned in USIM and Unified Data Management (UDM)/Universal Resources Management (UDR) function in 5G Core, and is usually a string of 15 decimal digits.

When switched on, a UE typically begins searching for a network. There is a possibility that there are many networks or many frequencies from different network operators to which the UE may connect. Therefore, the UE needs to synchronize to each frequency and determine to which of those frequencies it will connect. The UE performs this by undergoing an initial synchronization process. Once the UE has completed the synchronization process, it begins to use system information to establish wireless communications with(in) the network. System information includes the Master Information Block (MIB) and a number of System Information Blocks (SIBs). The MIB is broadcast on the Physical Broadcast Channel (PBCH), while SIBs are sent on the Physical Downlink Shared Channel (PDSCH) through Radio Resource Control (RRC) messages (i.e. via RRC messaging/signaling). A System Information (SI) message can contain one or several SIBs.

Currently, SNPNs are identified using a network identifier (NID) specific to the SNPN. Accordingly, an SNPN is identified overall by using a PLMN ID and an NID [PLMN ID+NID]. The network node (e.g. gNB) that provides access to the NPN may broadcast the PLMN ID and a list of NIDs, which identify each unique NPN. The UE shall reselect to other cells which support this SNPN, e.g. to a cell identified by the broadcasted [PLMN ID+NID]. As part of the registration process, the UE may first camp on (connect to) the cell which supports the [PLMN ID+NID] combination identifying the network that the UE is seeking to access (e.g. the SNPN for which the UE has SUPI credentials). The UE then performs a Non-Access Stratum (NAS) registration procedure, through the corresponding Access and Mobility Management Function (AMF) and Session Management Function (SMF), with the SNPN. The Unified Access Control (UAC) is defined per NPN for access control management.
Equivalent SNPN (eSNPN)

In the current specification, an SNPN is a standalone network and does not have access or visibility to other peer SNPNs. Thus, a UE which has credentials for a given SNPN may not be able to access other SNPNs, even though there may be reasons for the UE to access to those other SNPNs. However, in many cases, different private networks may be considered part of the same entity or enterprise. For example, a company, corporate entity, or educational entity may have different branches or locations all identified by the same PLMN ID, with each branch/location having its own deployed SNPN. Under certain scenarios it may be desirable to provide a UE access to all the different branch/satellite SNPNs. As an example, three universities may each have an SNPN, denoted by SNPN1, SNPN2, and SNPN3 in a region identified by the same PLMN ID, and the universities may also have shared resources to which students are provided access. However, as each SNPN is a standalone network, a UE which has credentials for, say, SNPN1, would not have access to SNPN2 and SNPN3. In order to solve this issue, according to some aspects, equivalent SNPNs (eSNPNs) may be established.

Accordingly, in order to improve ready access to desired SNPNs, a network (e.g. a base station in the network) may broadcast a list of equivalent SNPN(s) (eSNPN(s)) corresponding to a given SNPN, if such eSNPNs are available, to the UE. For example, the base station in the network may broadcast such a list in an SIB. Upon receiving the SIB, the UE may save the list of eSNPNs in a local database. Referring to the example above, the network may broadcast the following lists to the UE, depending on whether the UE's home SNPN is SNPN1, SNPN2, or SNPN3, where NIDx (for x=1, 2, 3) represents the NID for the corresponding SNPNx.

Home SNPN is SNPN1
    SNPN1=PLMN+NID1
    eSNPN1=PLMN+NID2
    eSNPN2=PLMN+NID3

Home SNPN is SNPN2
    SNPN2=PLMN+NID2
    eSNPN1=PLMN+NID1
    eSNPN2=PLMN+NID3

Home SNPN is SNPN3
    SNPN3=PLMN+NID3
    eSNPN1=PLMN+NID1
    eSNPN2=PLMN+NID2

When a UE associated with a given home SNPN, e.g. with SNPN1, is at a location/branch where one of the other SNPNs is deployed, the UE may lose the access to its home SNPN and may start scanning all the SNPN networks in that location/region. The UE may gain access to the visited SNPN as the visited SNPN has already been indicated to the UE as an eSNPN corresponding to its home SNPN. For example, for a UE having SNPN1 as its home SNPN, eSNPN1 and eSNPN2 (as shown in the list above) represent SNPNs equivalent to or corresponding to SNPN1, hence they are eSNPNs for the UE and are accessible by the UE. In some embodiments, the order in which the eSNPNs are broadcast (or listed) may also indicate the recommended priority of the broadcasted (listed) eSNPNs. For example, for a UE having SNPN1 as its home SNPN, eSNPN1 may have higher priority than eSNPN2. This may be especially useful when multiple eSNPNs overlap in certain deployments.

As noted above, the list of eSNPNs may be broadcast by the network in an SIB. However, when the list of eSNPNs is too large with too many multiple SNPNs, the SIB may become too large, and it may be preferable not to transmit a relatively large broadcast message. Therefore, according to some aspects, the list of eSNPNs may be transmitted to the UE as part of a NAS registration accept message. In such a case, the eSNPN list may be transmitted by the (radio access) network to the UE in the registration accept message in response to a NAS registration request. In some aspects, the registration accept message may be a unicast message targeting (or intended for) a specific UE as opposed to being transmitted as a broadcast message, thus reducing load on the network.

Roaming eSNPN

As previously discussed, multiple NPNs or SNPNs may be associated with or correspond to a single entity or enterprise, with those multiple different NPNs or SNPNs deployed at a location or locations and/or region(s) identified by the same PLMN ID. Additionally, for a given enterprise (e.g. a corporate entity or other enterprise), respective corresponding SNPNs may also be deployed in multiple locations, regions, and/or countries identified by different respective PLMN IDs. The UEs associated with that enterprise may be expected to have the ability to connect to those SNPNs seamlessly. The SNPN may again be defined/indicated as [PLMN ID+NID]. However, in this case the PLMN IDs may differ. For example, in case of different countries the PLMN ID is based on the mobile country code (MCC), and the PLMN ID may thus be different in (or for) each different location/region/country. In addition, the NID identifying the SNPN may be the same in all location/regions/countries, as it indicates the specific entity or enterprise as opposed to indicating a specific local SNPN. For example, assuming the UE is configured to camp (remain connected) on the SNPN corresponding to enterprise A in a first location/region/country, when the UE travels to a different, second location/region/country and scans for the SNPN (for enterprise A), there is a PLMN ID mismatch and the UE cannot gain access to the SNPN in the second location/region/country.

In order to allow access to the different SNPNs in a different location/region/country, a roaming eSNPN (ReSNPN) may be introduced. Similar to the example provided above for eSNPNs based on different NIDs for different local SNPNs, a list of ReSNPNs may be provided to the UE to allow the UE to access the SNPN corresponding to the enterprise in each location/region/country where SNPNs for that enterprise have been deployed. As an example, enterprise A may be identified by "NID". The home SNPN of enterprise A may be in a first location identified by PLMN ID1 in a country local to the UE. SNPNs of enterprise A in different locations/regions/countries may be accessed by the UE based as follows, where PLMN IDx (for x=1, 2, 3 for the local country, and x=4, 5, 6 for foreign countries) represents the PLMN ID for the corresponding locations/regions/countries:

SNPN1=PLMN ID1+NID
SNPN2 (cSNPN1)=PLMN ID2+NID
SNPN3 (eSNPN2)=PLMN ID3+NID
SNPN4 (ReSNPN1)=PLMN ID4+NID
SNPN5 (ReSNPN2)=PLMN ID5+NID
SNPN6 (ReSNPN3)=PLMN ID6+NID

The network in which the home SNPN (SNPN1) is deployed may broadcast the list of eSNPNs and ReSNPNs in the SIB. Upon receiving this SIB, the UE may save the list of eSNPNs and ReSNPNs in a local database, and utilize the information when camping on other SNPNs either on a local network or global network. It should be noted that the above methodology is equally applicable to public integrated NPNs, not only SNPNs. In addition, as the SNPN in the different countries belongs to the same enterprise (e.g. enterprise A), human readable enterprise names may also be the same in different countries. Accordingly, in some embodiments, human readable names may also be broadcast in the SIB, e.g. with an ASCII character string or string encoded in UTF-8 format representing the enterprise name to be broadcast.

According to some aspects, the enterprise may be using a global unique NID for each different SNPN deployed in different countries, with the SNPN in each country having a unique NID (e.g. in contrast to enterprise A being identified by the same NID in all countries as indicated above). In such embodiments, to identify the enterprise uniquely across different countries and display the SNPN network name in a human readable format, an additional "EnID" field may be introduced in the SIB. Accordingly, the SNPN may then be defined as SNPN=PLMN ID+NID+EnID, where EnID stands for "Enterprise ID". The EnID is expected to be the same for all NPNs of a particular enterprise across the globe.

NID Management Function (NMF)

With the size and number of eSNPN lists (and ReSNPN lists) increasing, broadcasting such lists via SIBs may become problematic. For example, an enterprise or organization may setup offices in multiple countries and may add tie-ins to various different partners/vendors in different locations, all of which may potentially be considered eSNPNs. Thus, in order to support the creation and management of eSNPNs and ReSNPNs, a new network identification management function (NID management function or NMF in short) may be introduced. The NMF may implement various tasks/features related to eSNPNs and ReSNPNs. The NMF may be introduced as a core network function, for example in a 5G/NR network architecture (5GC), for maintaining a database of the list of SNPN(s), e.g. NID list(s) and/or [NID+PLMN] list(s). The NMF may also maintain the equivalent PLMN list for all the UEs registered in a given SNPN.

Figure 7:
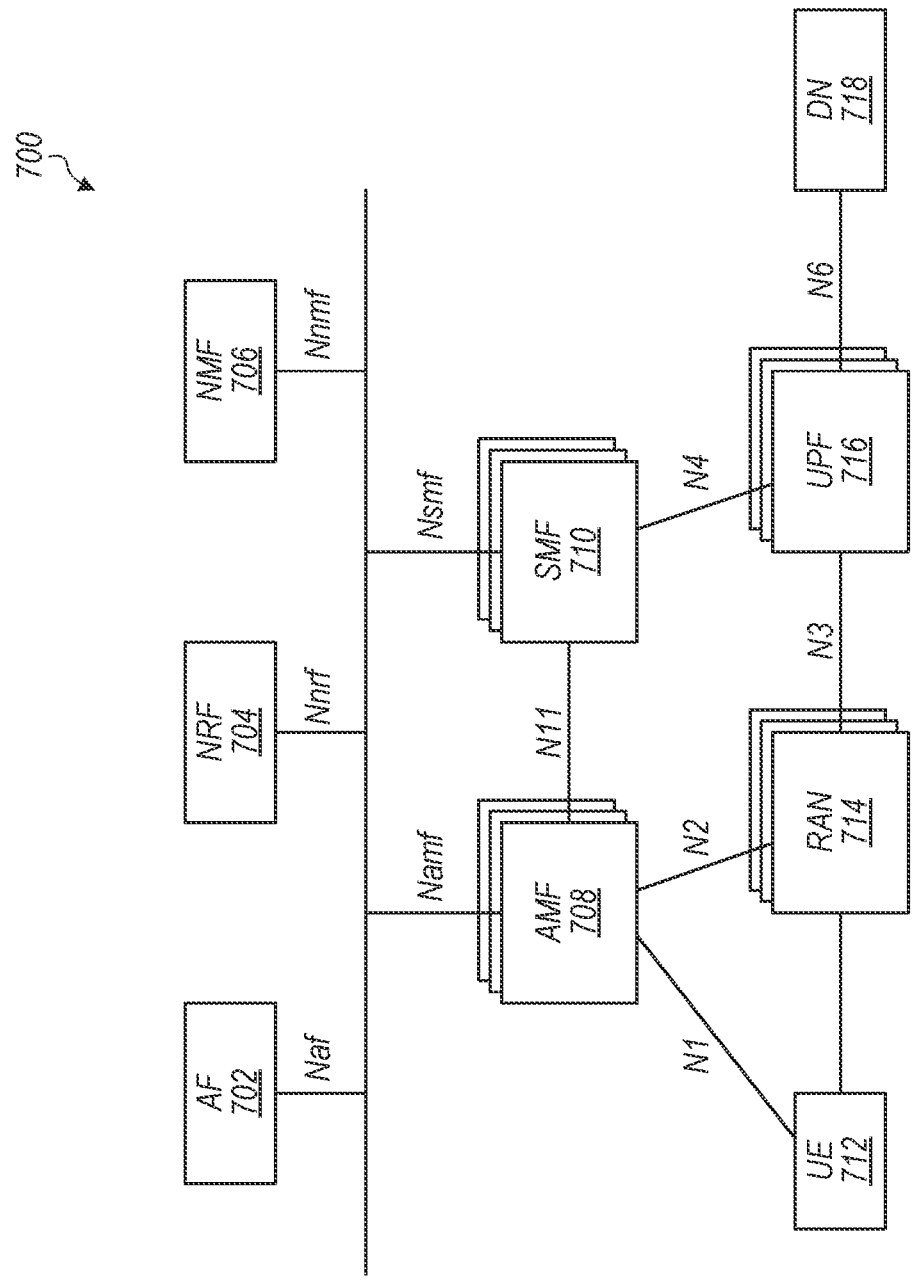
FIG. 7 is a diagram of an exemplary wireless network architecture with a network identification management function (NMF), according to some embodiments.

FIG. 7 shows a simplified diagram of an exemplary wireless network architecture with an NMF. As shown in FIG. 7, the core network functions of a wireless network include an Application Function (AF) 702 and Access and Mobility Management Function (AMF) 708, which may update the NMF 706 by adding and removing eSNPN(s) for a UE or set of UEs. According to some aspects, the NMF may also be updated by the unified data management (UDM) function, which is not shown in FIG. 7. Other network functions include a Network Repository Function (NRF) 704, a Session Management Function (SMF) 710, and a User Plane Function (UPF) 716. As shown in FIG. 7, UE 712 interfaces with AMF 708 and the radio access network (RAN) 714, with UPF 176 providing a link between RAN 714 and data network (DN) 718. In some embodiments, when the AMF 708 receives a registration request from a UE 712 located in an eSNPN, the AMF 708 may query the NMF 706 to validate the credentials and retrieve the eSNPN list for UE 712. The NMF 706 may accept the query and map eSNPNs for UE 712. The list of eSNPNs may then be retrieved by AMF 708, which may transmit the eSNPN list to the UE 712 as part of the Registration Accept (RA) message. In order for the RA message to carry the eSNPN list, a new "eSNPN" information element (IE) may be added to the RA message. In some embodiments, the NMF 706 may be implemented as SW in a Unified Data Management (UDM)/User Data Repository (UDR) module. According to some aspects, AF 702 may be a cloud service which may be controlled by the enterprise entity, e.g. a corporate entity, and may populate the NMF database with new eSNPN(s). Overall, the NMF 706 may create and maintain the list of cSNPNs and/or ReSNPNs, with AF 702 and AMF 708 having access to the NMF. When AMF 708 transmits the configuration update command with the eSNPN IE, it may transmit newly added eSNPN(s) with a flag indicating that the included eSNPN(s) are to be added to an already existing list, or it may transmit the entire eSNPN list.

Figure 8:
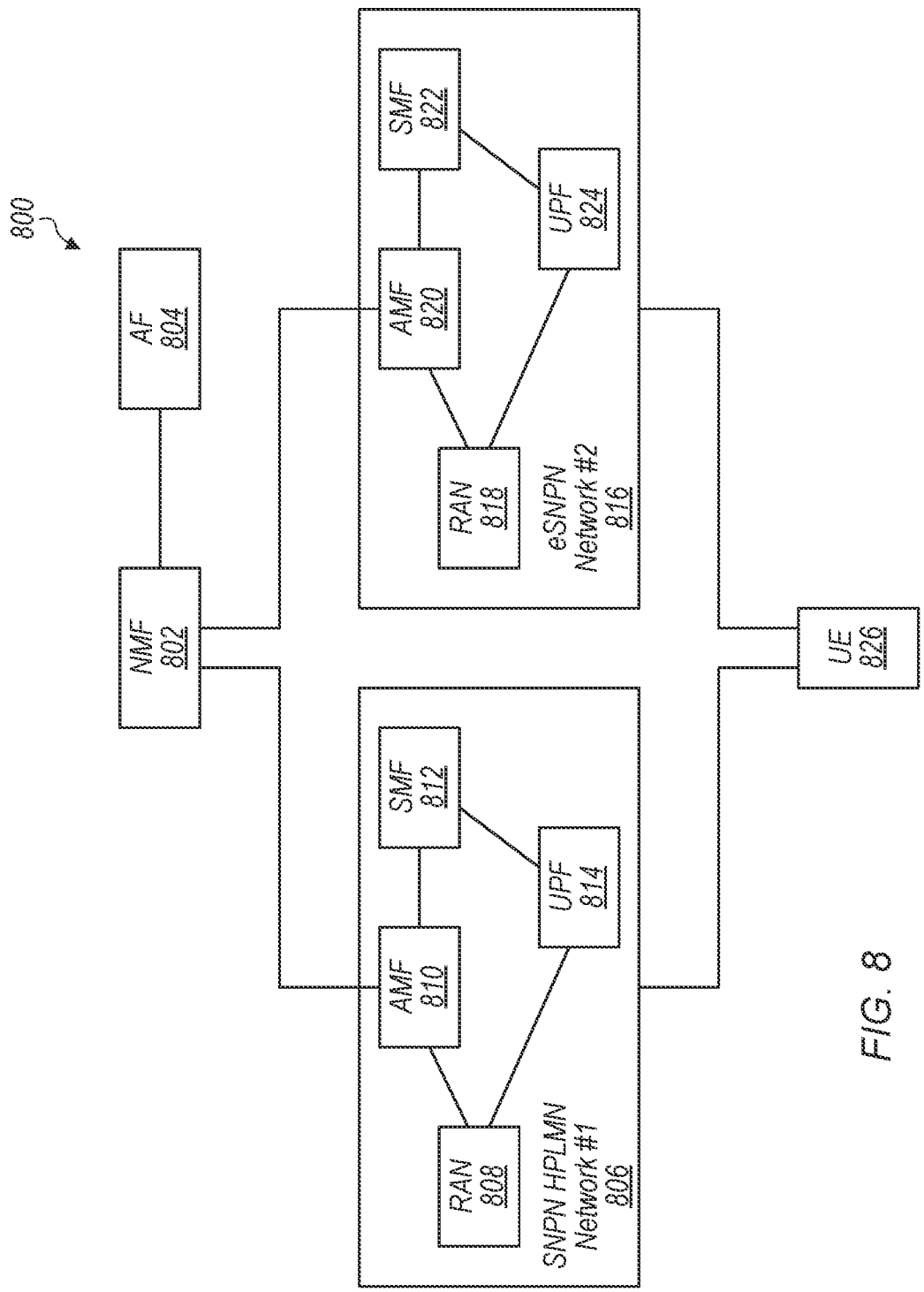
FIG. 8 is a diagram of an exemplary wireless network architecture with a single NMF, according to some embodiments.

Exemplary Network Architecture with Single NMF—FIG. 8

FIG. 8 shows a simplified diagram of an exemplary wireless network architecture with a single NMF 802. A first network 806 represents a home PLMN for a UE 826, while a second network 816 represents an eSNPN for UE 826. Network 806 operates on RAN 808 while network 816 operates on RAN 818. Each respective network has its own set of network functions, such as AMF (810 and 820, respectively), SMF (812 and 822, respectively), and UPF (814 and 824, respectively). In the architecture of FIG. 8, both networks 806 and 816 use a single NMF 802 accessed by AF 804. AMF 810 and AMF 820 may both communicate with NMF 802, for example to query NMF 802 to validate the credentials of UE 826 when the UE 826 is registering on the network serviced by the corresponding AMF, and retrieve the eSNPN list for UE 826.

Figure 9:
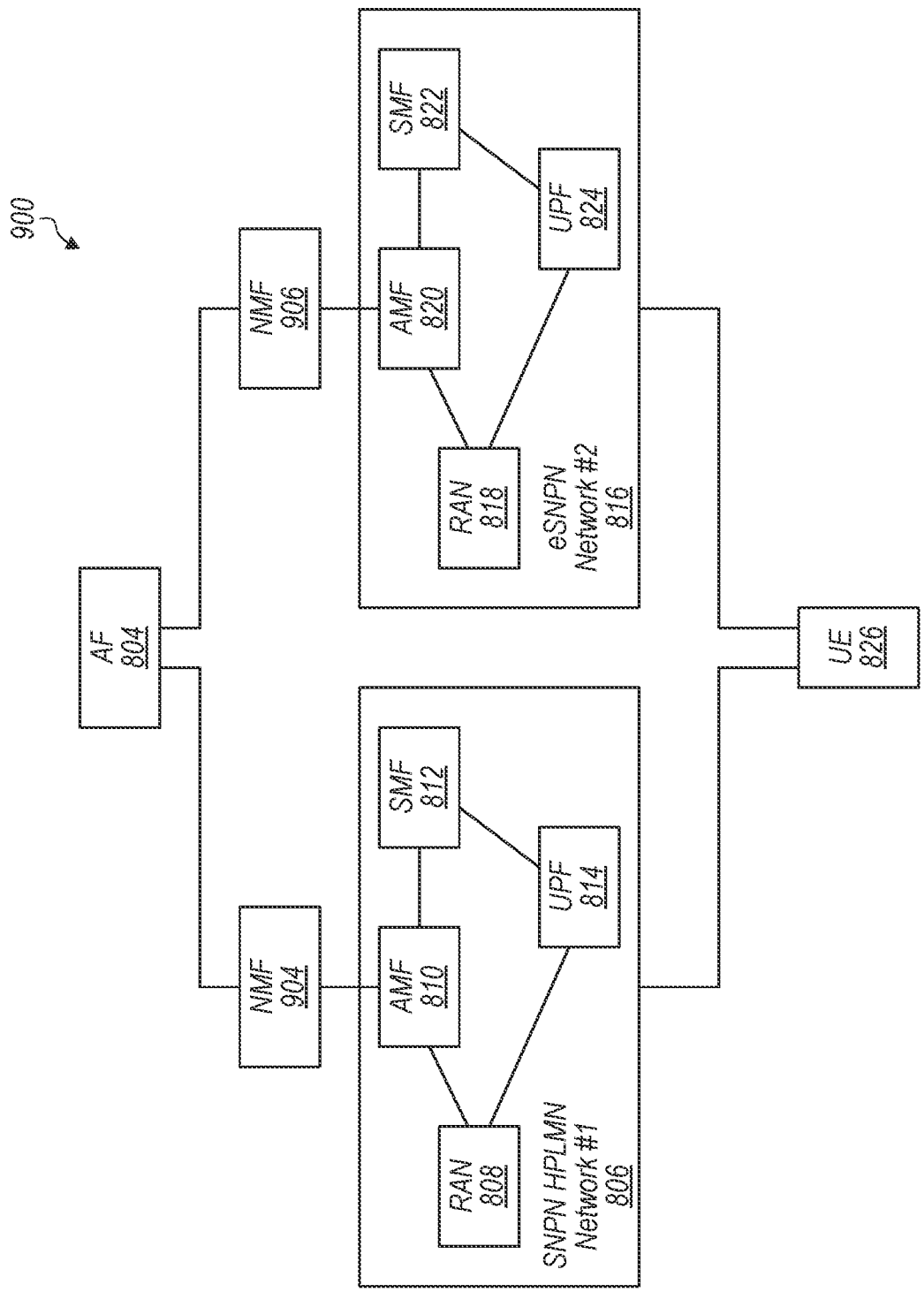
FIG. 9 is a diagram of an exemplary wireless network architecture with multiple NMFs. according to some embodiments.

Exemplary Network Architecture with Multiple NMFs—FIG. 9

FIG. 9 shows a simplified diagram of an exemplary wireless network architecture with multiple NMFs. The network architecture shown in FIG. 9 is similar to the architecture shown in FIG. 8, but instead of a single NMF 802, two NMFs 904 and 906 are used to maintain and manage eSNPN and/or ReSNPN lists. Accordingly, in the architecture of FIG. 9, the two networks 806 and 816 use corresponding respective NMFs 904 and 906, both in communication with AF 804. AMF 810 may communicate with NMF 904 while AMF 820 may communicate with NMF 906. For example, AMF 820 may query NMF 906 to validate the credentials of UE 826 when the UE 826 is registering on network 816 serviced AMF 820, and retrieve the eSNPN/ReSNPN list for UE 826. Similarly, AMF 810 may query NMF 904 to validate the credentials of UE 826 when the UE 826 is registering on network 806 serviced AMF 810, and retrieve the eSNPN/ReSNPN list for UE 826.

Figure 10:
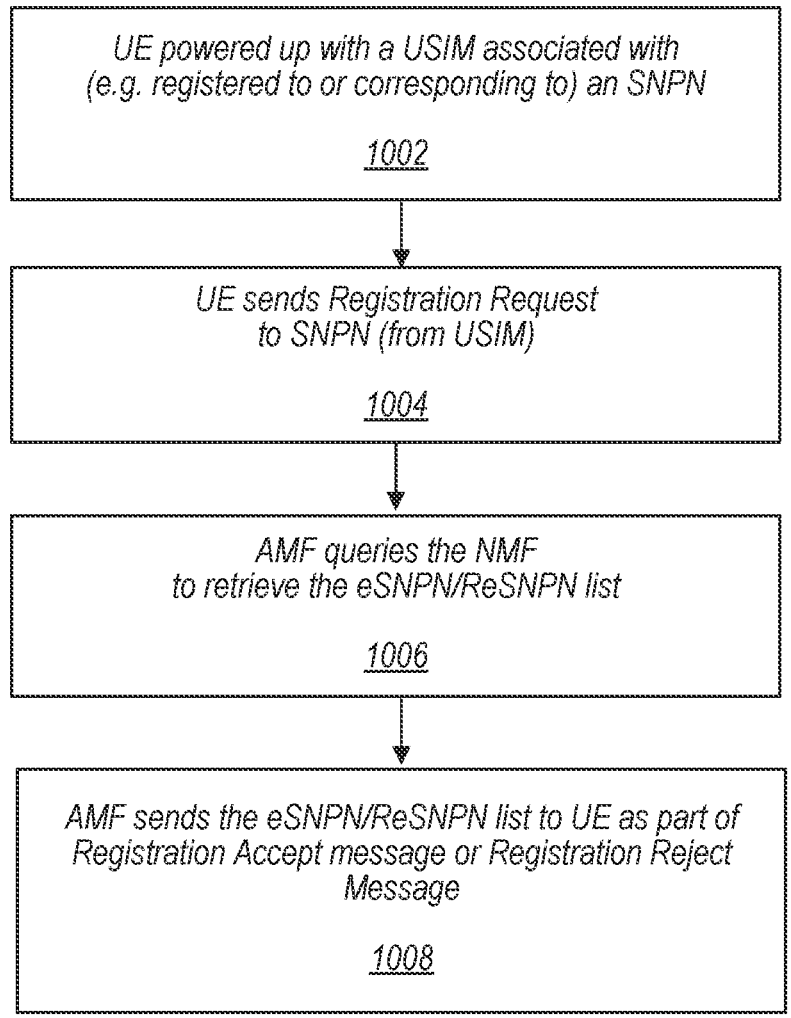
FIG. 10 shows a flow diagram of an exemplary procedure for updating a wireless communication device (UE) with an eSNPN list, according to some embodiments.

Exemplary Procedure for Providing an eSNPN/ReSNPN List to a UE—FIG. 10

FIG. 10 shows a simplified flow diagram of an exemplary procedure for updating a UE with an eSNPN/ReSNPN list, e.g. providing/transmitting such a list to a UE. The exemplary procedure may be in reference to FIGS. 7-9 with respect to the use of various core network functions as previously described. With the addition of an NMF for mapping and maintaining eSNPN/ReSNPN lists, those lists may be provided to the UE as part of the registration process when the UE is registering in (or on) an SNPN. The UE may power up with a User Subscriber Identity Module (USIM) of an SNPN, e.g. a USIM storing credentials and information corresponding to or associated with a specific SNPN (1002). Once powered up, the UE may send a registration request (RR) to the AMF servicing the SNPN, with the RR including the necessary credentials (1004). After authentication of the UE is complete, the AMF may query the NMF to retrieve the list(s) of eSNPNs/ReSNPNs mapped for the UE (1006). The NMF may forward the list(s) of eSNPNs/ReSNPNs to the AMF, and the AMF may add the data (e.g. the list(s)) received from the NMF to the RA message or a registration reject (RR) message, and transmit the list(s) to the UE as part of the RA message or RR message (1008).

Figure 11:
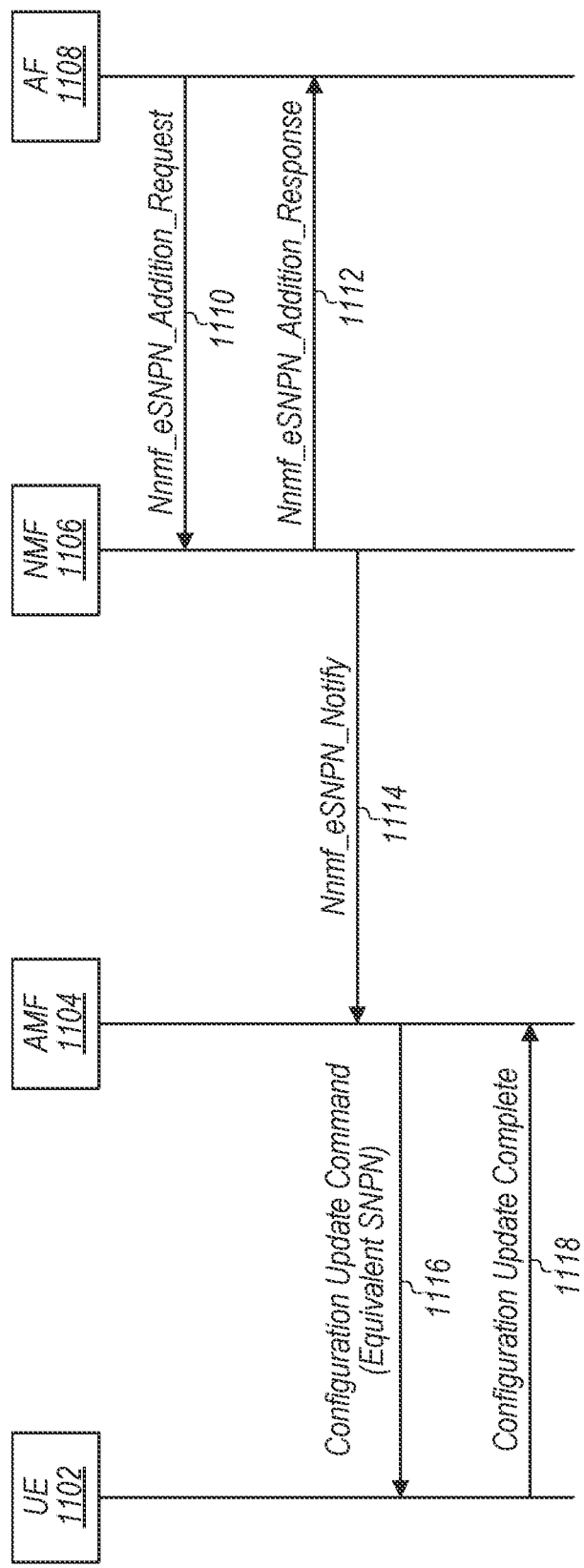
FIG. 11 shows a flow diagram of an exemplary procedure for adding a new SNPN to an eSNPN list maintained by an NMF, according to some embodiments.

Exemplary Procedure for Adding an SNPN to an eSNPN/ReSNPN List—FIG. 11

FIG. 11 shows a simplified flow diagram of an exemplary procedure for adding an SNPN to an eSNPN/ReSNPN list maintained by an NMF. Again, the exemplary procedure may be in reference to FIGS. 7-9 with respect to the use of various core network functions as previously described. With the NMF maintaining eSNPN/ReSNPN lists, SNPNs may be added to and deleted from the eSNPN/ReSNPN list. Accordingly, for operational reasons, one or more SNPNs may be added to the eSNPN/ReSNPN list stored in the NMF. The AF 1108 may instruct (e.g. request) the NMF 1106 to add new SNPN(s) to the eSNPN/ReSNPN list (1110). The NMF 1106 may acknowledge the request and add the new SNPN(s) to the eSNPN/ReSNPN list, and send a response to AF 1108 indicative of the list having been updated (1112). The NMF 1106 may then notify the AMF 1104 about the update of the eSNPN/ReSNPN list (1114). The AMF 1104 may send a configuration update command to UE 1102, with the command including the entire eSNPN/ReSNPN list or one or more SNPNs to be added to the eSNPN/ReSNPN list (1116). The UE 1102 may update its eSNPN/ReSNPN list and transmit a configuration update complete message to AMF 1104 (1118).

Figure 12:
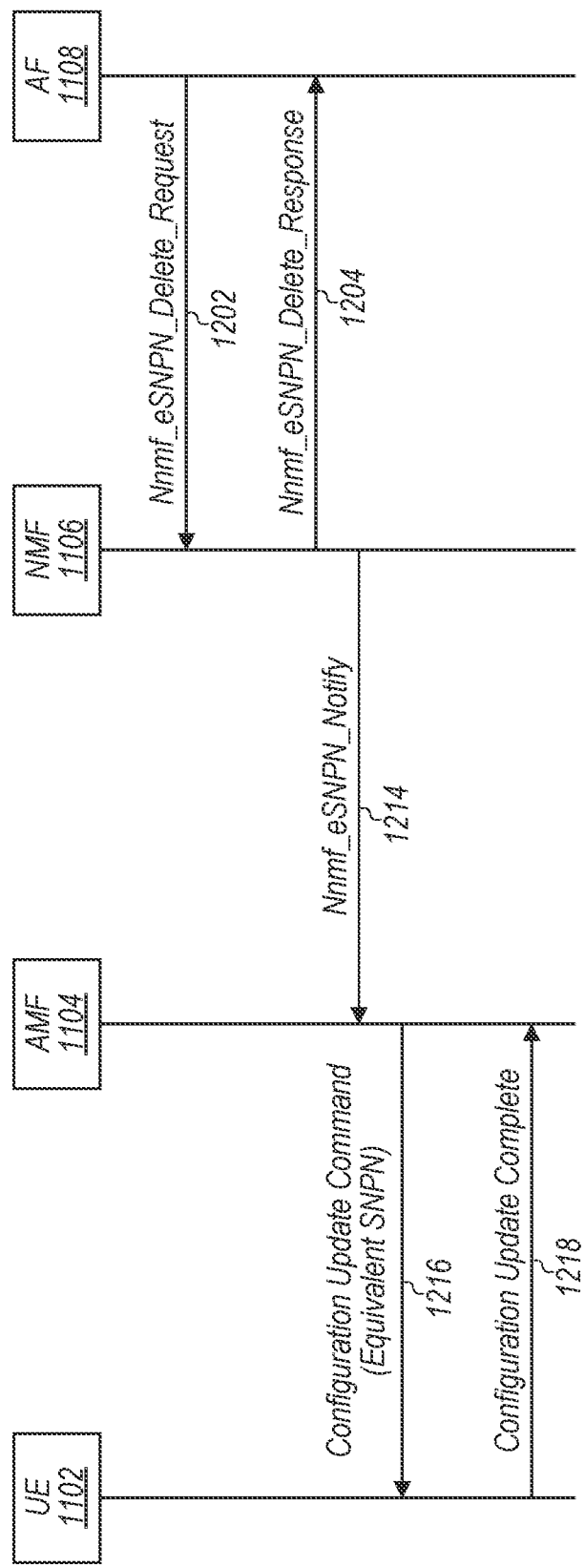
FIG. 12 shows a flow diagram of an exemplary procedure for deleting an SNPN from an eSNPN list maintained by an NMF, according to some embodiments.

Exemplary Procedure for Deleting an SNPN from an eSNPN/ReSNPN List—FIG. 12

FIG. 12 shows a flow diagram of an exemplary procedure for deleting an SNPN from an eSNPN list maintained by an NMF. Again, the exemplary procedure may be in reference to FIGS. 7-9 with respect to the use of various core network functions as previously described. For operational reasons, one or more SNPNs may be removed from the eSNPN/ReSNPN list stored/maintained in the NMF. The AF 1108 may instruct (e.g. request) the NMF 1106 to delete SNPN(s) from the eSNPN/ReSNPN list (1202). The NMF 1106 may acknowledge the request and delete the SNPN(s) from the eSNPN/ReSNPN list, and send a response to AF 1108 indicative of the list having been updated (1204). The NMF 1106 may then notify the AMF 1104 about the update of the eSNPN/ReSNPN list (1214). The AMF 1104 may send a configuration update command to UE 1102, with the command including the entire eSNPN/ReSNPN list or one or more SNPNs to be deleted from the eSNPN/ReSNPN list (1216). The UE 1102 may update its eSNPN/ReSNPN list and transmit a configuration update complete message to AMF 1104 (1218).

Figure 13:
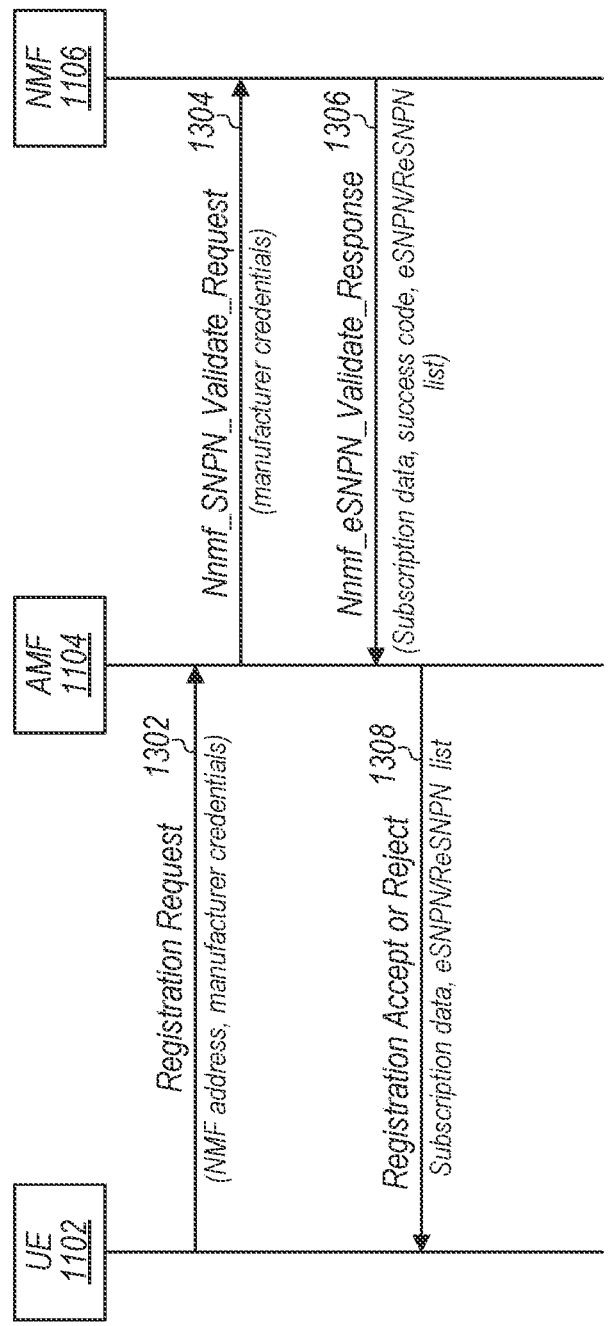
FIG. 13 shows a flow diagram of an exemplary onboarding procedure using an NMF, according to some embodiments.

Exemplary Onboarding Procedure Using an NMF—FIG. 13

Onboarding refers to a process by which a new device gains access to a wired or wireless network for the first time.

When the UE powers up for the very first time, it may need to determine which network—e.g. which SNPN—to connect to (e.g. to camp or remain on), as there may be requirements (e.g. 3GPP requirements) for the UE not to send a registration request to an SNPN to which the UE has no access. For example, the UE may be required not to send a registration request to an SNPN that the UE is not authorized to access and/or may not have the necessary credentials to access. Eliminating such access attempts saves resources and time, and NMFs may thus be used for more efficient UE onboarding. FIG. 13 shows a simplified flow diagram of an exemplary onboarding procedure using an NMF. Again, the exemplary procedure may be in reference to FIGS. 7-9 with respect to the use of various core network functions as previously described. For the procedure exemplified in FIG. 13, an assumption is made that the UE 1102 has the manufacturer credentials and NMF address internally stored, for example in non-volatile memory within UE 1102, or as part of the UE software itself. The UE 1102 may find and select an SNPN via automatic or manual selection, and send an RR to AMF 1104 with the manufacturer credentials and NMF address (1302). The AMF 1104 may locate the NMF 1106 via the address provided by the UE, and may provide the manufacturer credentials to NMF 1106 in a validation request to validate the subscription of the UE (1304). The NMF 1106 may validate the received credentials and retrieve the matching subscription data, then provide the subscription data and cSNPN/ReSNPN list(s) to the AMF 1104 in a validation response (1306). The AMF 1104 may forward the subscription data and cSNPN/ReSNPN list(s) to the UE 1102 as part of the RA message or as part of an RR message (1308). For example, the, AMF 1104 may send a registration reject message to the UE 1102 and include the eSNPN/ReSNPN list(s) in this message, which may cause the UE 1102 to initiate a new registration procedure on a "preferred" NPN included in the eSNPN/ReSNPN list(s). This process may be referred to as "Steering of NPN roaming".

Service Operations Provided by an NMF—FIG. 14

FIG. 14 shows a simplified table 1400 listing exemplary service operations that may be provided by an NMF.

"SNPN Not Allowed" Cause Code

With respect to SNPNs, the current standard defines only two cause codes:
  Temporarily not authorized for this SNPN (#74), and
  Permanently not authorized for this SNPN (#75).
However, there may be situations when access to a specific SNPN may be prohibited (not allowed) until further notice, at which time access may be allowed/provided to that specific SNPN. For example, an entity or enterprise may have an SNPN1 for all employees and an SNPN2 for projects which only selected employees are allowed to access. A new employee may join the entity/enterprise and receive access to SNPN1 but not to SNPN2, though access to SNPN2 may be granted to the new employee at a later point in time. For such cases, a new cause code, "SNPN not allowed" may be introduced. Upon receiving this cause code, the UE may delete the list of eSNPNs/ReSNPNs, reset the registration attempt counter, and store the SNPN identity in the database. Accordingly, not only is access to the specific SNPN not authorized, the eSNPN/ReSNPN list is also flushed. Once the UE gains access to SNPN2, AMF may update the UE via a configuration update command that may include information regarding the updated list of eSNPN/ReSNPNs.

Identification of SNPN Specific Cell

Radio access network (RAN) support may be provided for identifying SNPN specific cells. Cells with SNPN-only access may need to broadcast a 'reserved-for-SNPN-use' field in an SIB message to help prevent regular PLMN users from camping on SNPN-only access cells. This may be especially important in areas which have overlaying PLMN and SNPN access cells.

Integrated Non-Public Networks

NPNs may be implemented as network slices of PLMNs. Network slicing refers to the separation of multiple virtual networks that operate on the same physical hardware for different applications, services or purposes. Network slicing separates the control plane from the user plane to move user plane functionality towards the network edge. Each network slice may have its own architecture, provisioning management and security that supports a particular use case. With low latency connection and adequate bandwidth, the prioritization of different tasks may be performed on a software level division of the network. The slices that occupy a single physical network are separated, meaning traffic and security breaches from one slice cannot interfere with another slice. Identification of a network slice is performed via the Single Network Slice Selection Assistance Information (S-NSSAI). The NSSAI is a collection of S-NSSAIs. For example, 3GPP presently allows up to eight (8) S-NSSAIs in the Requested and Allowed NSSAI sent in signaling messages between the UE and the network (e.g. between the UE and a base station in the network). This means a single UE may be served by at most eight network slices at a time. The S-NSSAI signaled by the UE to the network assists the network in selecting a particular network slice instance. An S-NSSAI typically includes:
  A slice/service type (SST), which refers to the expected network slice behavior in terms of features and services, and
  A slice differentiator (SD), which represents optional information that complements the SST to differentiate amongst multiple network slices of the same SST.
The S-NSSAI may be associated with a PLMN (e.g., PLMN ID) and have network-specific values or standard values. An S-NSSAI may be used by the UE to access the network in the PLMN with which the S-NSSAI is associated.

Presently, a network slice is configured during the registration procedure, and is applicable to the entire PLMN. However, certain slicing features may only be available or authorized in some specific locations. When a network slice is allowed, the UE may assume that the slice is allowed for all UEs accessing the PLMN. However, an NPN may not be intended to be accessible to all UEs on the PLMN. Therefore, the concept of network slice support per registration/tracking area may be introduced, with a corresponding procedure for negotiation of a network slice per registration area and/or tracking area. During every mobility registration update, the UE and network may renegotiate the list of allowed NSSAIs. For example, every time the UE moves into a new registration/tracking area, the UE and network may renegotiate the list of allowed NSSAIs. The network may thus indicate to the UE whether or not the UE is allowed to access that network slice. Additionally or alternatively, the network (e.g. base station in the network) may also proactively update the UE with an "allowed NSSAI" indication via UE configuration update command at any time.

Public Integrated NPN Roaming

Some additional issues may need to be considered when an NPN is implemented as a network slice instance (NSI). For example, an enterprise or entity may have a public integrated NPN in each of its geographical locations. A UE associated with a home NPN in one location may also need to seamlessly camp on (or remain connected to) the network in a different location and access the NSI corresponding to the NPN. While there are currently provisions for mapping the home PLMN (HPLMN), no such mapping exists for NPN(s). According to some aspects, in order to seamlessly access the NSI corresponding to the NPN as described above, the UE may send a packet data unit (PDU) session establishment request with an S-NSSAI (containing the NPN NSI), and may also provide an HPLMN mapping for this S-NSSAI. This may be achieved through the introduction of new values to the S-NSSAI IE. Accordingly, the following new parameters (or parameter values) may be added to the S-NSSAI IE for NPN:

SST and mapped NPN SST,
SST, SD and mapped NPN SST,
SST. SD, mapped NPN SST and mapped NPN SD,
SST and mapped SNPN SST.
SST. SD and mapped SNPN SST, and
SST, SD, mapped SNPN SST and mapped SNPN SD.

The new values may be introduced by assigning some of the previously reserved values to the parameters listed above. That is, previously reserved values may be used as different values respectively corresponding to the newly introduced parameters listed above.

There are presently no provisions for indicating whether a particular S-NSSAI or a group of S-NSSAIs are associated with an NPN or a PLMN or both. In order to make such provisions, an SD may be required for NPN. For example a hospital enterprise may contain an NPN with multiple slices or multiple instances of an S-NSSAI, with each slice serving a specific characteristic (e.g., operations, finance, doctor logins, etc.) The UE may receive UE route selection policy (URSP) rules with DNN, and route and traffic descriptor details about how to access each NSI of this NPN, along with the indication regarding the association of the S-NSSAI (NPN, PLMN, or both). This may help the UE identify whether the NSI is for serving the PLMN or the NPN or both.

UE Implementations

In some embodiments, NPN access may be implemented in a UE having a dual-SIM setup with independent subscription. For example, SIM1 may be a subscription to a normal/regular 3GPP PLMN access (e.g. a major service provider), while SIM2 may be configured for SNPN access. A UE supporting simultaneous connectivity to an SNPN and a PLMN may perform network selection as applicable for gaining access to the SNPN network and the PLMN network, respectively. Whether the UE uses SNPN or PLMN for its services may be implementation dependent. For example, certain applications executing on (or executed by) the UE may be restricted to use only the PLMN, while other apps (e.g. internal or enterprise apps) may be restricted to use only the SNPN. The mapping of applications to the respective networks the applications are instructed to or expected to use may be internal in the device, e.g. with the applications mapped to respective corresponding SIMs. For a UE capable of simultaneously connecting to an SNPN and a PLMN, the setting for operation in SNPN access mode may be applied only to the Uu interface for connection to the SNPN. Details of the activation and deactivation of SNPN access mode may be implemented as desired for each UE. Accordingly, when invoking certain applications, the UE may use its SIM1 connection (e.g. by relying on credentials/data stored in SIM1), and when invoking applications related to the SNPN (e.g. enterprise applications), the UE may use its SIM2 connection (e.g. by relying on credentials/data stored in SIM2). The UE may need to determine if the SNPN allows access to SNS apps but is tracked by the private network. Use of SIM1 may be non-tracked.

Regarding the configuration and subscription information of the UE, if a UE is not set to operate in SNPN access mode, even if it is SNPN-enabled, the UE may not select and register with SNPNs. A UE not set to operate in SNPN access mode may perform PLMN selection procedures as currently defined (e.g. in the 3GPP standard; clause 4.4. of TS 23.122). For example, in case an SNPN is used for office (business) communications while a PLMN is used for personal communications, the SNPN may be automatically activated/deactivated over the PLMN as follows. Depending on the geographical location or registration area of the SNPN, if the UE is relocated to the office, SNPN access may get enabled/activated and PLMN access may be disabled/deactivated, otherwise SNPN access may be disabled/deactivated and PLMN access may be enabled/activated. The enabling/disabling or activating/deactivating may be configured based on timing considerations. For example, an office time period (e.g. 9 am-6 pm) may be designated, and if the UE is in an SNPN registration area during that time period, SNPN access may be (automatically) activated and PLMN access may be (automatically) deactivated. Outside the designated office time period, SNPN access may be (automatically) deactivated and PLMN access may be (automatically) activated.

Network selection in SNPN access mode may be performed as follows. When set to operate in SNPN access mode, a UE may not perform normal PLMN selection procedures as currently defined (e.g. in the current 3GPP standard; clause 4.4. of TS 23.122). UEs operating in SNPN access mode may read the available PLMN IDs and list of available NIDs from the broadcast system information, and take them into account during network selection. For automatic network selection, the UE may select and attempt to register with the available SNPN identified by a PLMN ID and NID for which the UE has SUPI and credentials. If multiple SNPNs—for which the UE has respective SUPI and credentials—are available, the priority order for selecting and attempting to register with SNPNs may be based on UE implementation. For example, a priority list may be maintained based on visit frequency (how often an SNPN is visited/accessed), broadcast order in SIB (e.g. top level in SIB broadcast order is highest priority and lowest level is lowest priority), and/or SUPI. For example, the priority order for SNPN access, when the UE has credentials for multiple SNPNs, may depend on how frequently a respective SNPN is visited within a day/week/month, the order in which the SNPNs are broadcast in the SIB, and/or the SUPI (PLMN+NID; e.g. a home country may have highest priority). Alternately, the UE may feature a user input (UI) for a user to dynamically update the priority of the SNPNs and update the list.

For example, an enterprise may maintain multiple SNPNs for each specific project. An employee may have the main enterprise SNPN as the highest priority SNPN. Once the employee gets disclosure for a specific project, the corresponding SNPN (e.g. the SNPN corresponding to the project) may be added to the subscription list for the employee. The UE may also have the capability to set the priority of SNPNs.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICS. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
transmitting, via a device to a first standalone non-public network (SNPN), a registration request for the device to register with the first SNPN;
receiving, at the device, a registration accept message from the first SNPN in response to the registration request, wherein the registration accept message comprises a list of equivalent SNPNs corresponding to the first SNPN, with the equivalent SNPNs accessible to the device as equivalents of the first SNPN; and
accessing, via the device at a time following reception of the registration accept message, a second SNPN from the list of equivalent SNPNs.

2. The method of claim 1, further comprising:
storing, the list of equivalent SNPNs in a memory of the device.

3. The method of claim 1, further comprising:
attempting to register, via the device at a second time following reception of the registration accept message, with a given SNPN from the list of equivalent SNPNs, wherein the given SNPN is selected by the device according to a priority list corresponding to the equivalent SNPNs.

4. The method of claim 1, wherein the list of equivalent SNPNs is added to the registration accept message by an access and mobility function.

5. The method of claim 1, wherein the list of equivalent SNPNs is maintained and managed by a network identifier management function.

6. The method of claim 1, wherein registration request comprises credentials of the device and an address of a network identifier management function (NMF);
the method further comprising:
providing the credentials and the address from the registration request to an access and mobility function (AMF);
providing, by the AMF in a validation request, the credentials to the NMF identified via the address;
retrieving and providing, by the NMF to the AMF in response to validating the credentials,
the list of equivalent SNPNs, and
subscription data matching the device; and
including, by the AMF, the list of equivalent SNPNs and the subscription data in the registration accept message.

7. The method of claim 6, wherein the credentials and the address are stored in a non-volatile memory within the device.

8. A method comprising:
receiving, by a first standalone non-public network (SNPN) from a device, a registration request for the device to register with the first SNPN; and
transmitting, by the first SNPN to the device, a registration accept message in response to the registration request, wherein the registration accept message comprises a list of equivalent SNPNs corresponding to the first SNPN, wherein the equivalent SNPNs are accessible to the device as equivalents of the first SNPN for the device to access any SNPN from the list of equivalent SNPNs at a time following reception of the registration accept message.

9. The method of claim 8, wherein the list of equivalent SNPNs is added to the registration accept message by an access and mobility function.

10. The method of claim 8, wherein the list of equivalent SNPNs originates from a network identifier management function.

11. The method of claim 8, further comprising:
receiving, by the first SNPN from a second device, a second registration request for the second device to register with the first SNPN; and
transmitting, by the first SNPN to the device, a registration reject message in response to the registration request, wherein the registration reject message comprises a second list of second equivalent SNPNs, wherein the second equivalent SNPNs are accessible to the second device for the second device to access any second SNPN from the second list of second equivalent SNPNs at a time following reception of the registration reject message.

12. The method of claim 11, wherein the second registration request message comprises credentials of the second device and an address of a network identifier management function (NMF);
the method further comprising transmitting the registration reject message based at least on subscription data associated with the credentials of the second device.

13. The method of claim 12, wherein the subscription data is retrieved by the NMF and provided to an access and mobility function along with the second list of second equivalent SNPNs for inclusion in the registration reject message.

14. An apparatus comprising:
a processor configured to cause a device to:
transmit, to a first standalone non-public network (SNPN), a registration request for the device to register with the first SNPN;
receive a registration accept message from the first SNPN in response to the registration request, wherein the registration accept message comprises a list of equivalent SNPNs corresponding to the first SNPN, with the equivalent SNPNs accessible to the device as equivalents of the first SNPN; and
access, at a time following reception of the registration accept message, a second SNPN from the list of equivalent SNPNs.

15. The apparatus of claim 14, wherein the processor is further configured to store the list of equivalent SNPNs in a memory of the device.

16. The apparatus of claim 14, wherein the processor is further configured to:
select a given SNPN from the list of equivalent SNPNs according to a priority list corresponding to the equivalent SNPNs; and
cause the device to attempt to register, at a second time following reception of the registration accept message, with the given SNPN.

17. The apparatus of claim 14, wherein the list of equivalent SNPNs is added to the registration accept message by an access and mobility function.

18. The apparatus of claim 14, wherein the list of equivalent SNPNs is maintained and managed by a network identifier management function.

19. The apparatus of claim 18, wherein the registration request message comprises credentials of the device; and
wherein the registration accept message is based at least on subscription data associated with the credentials of the device.

20. The apparatus of claim 19, wherein the registration request message comprises an address of a network identifier management function (NMF) that identifies the NMF to an access and mobility function (AMF);
wherein the subscription data is retrieved by the NMF in response to a validation request that comprises the credentials and is received by the NMF from the AMF; and
wherein the subscription data is provided to the AMF by the NMF along with the list of equivalent SNPNs for inclusion in the registration accept message.

* * * * *